United States Patent Office 3,040,490
Patented June 26, 1962

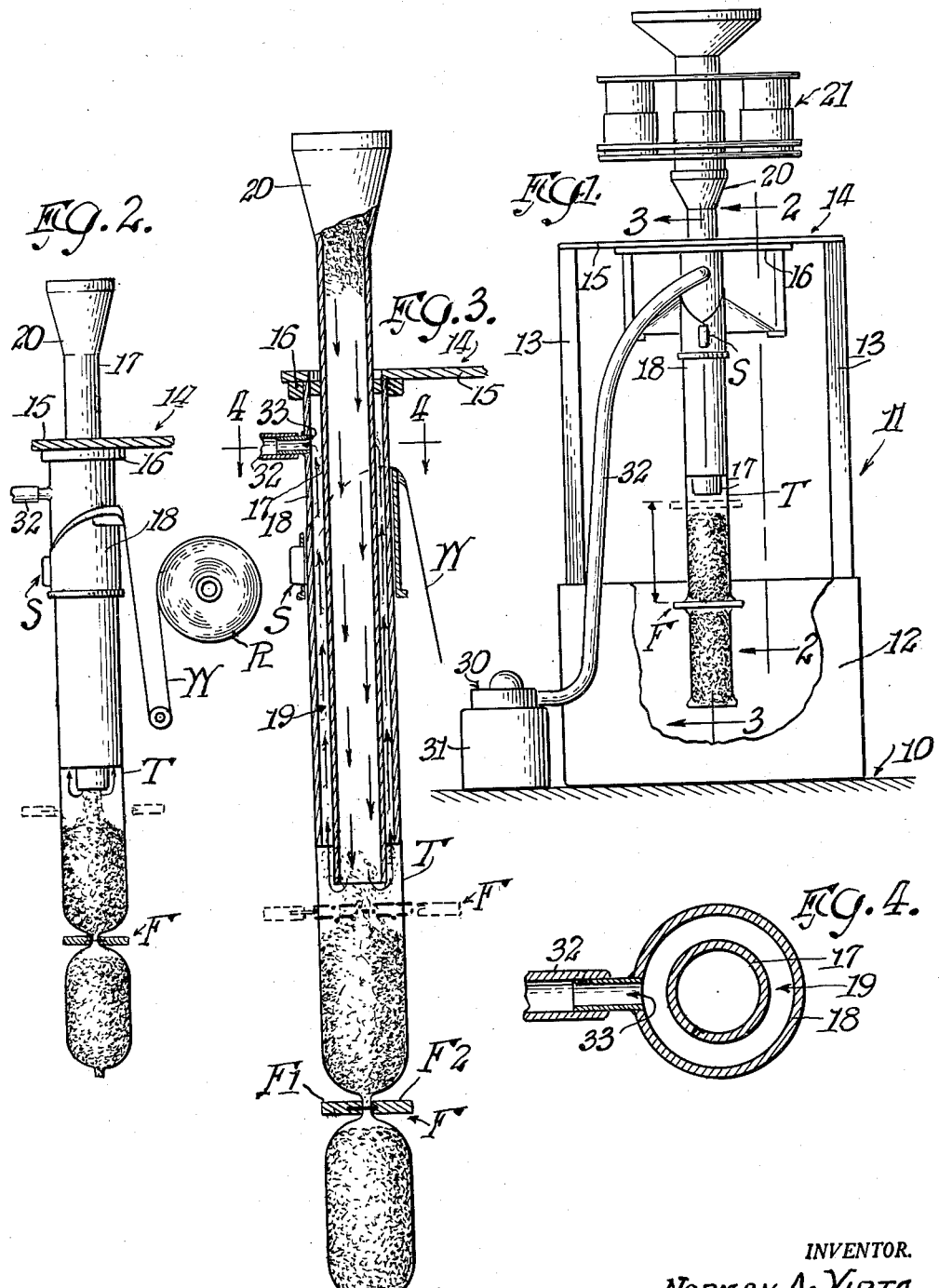

3,040,490
APPARATUS AND METHOD FOR MAKING, FILLING, AND SEALING CONTAINERS
Norman A. Virta, Mount Prospect, Ill., assignor to Triangle Package Machinery Company, Chicago, Ill., a corporation of Illinois
Filed May 31, 1960, Ser. No. 32,898
12 Claims. (Cl. 53—22)

My invention relates to apparatus and methods for making, filling, and sealing containers but relates more particularly to the making and filling of containers which are made of web sheet material of which Pliofilm, cellophane and the like are examples.

Also, as by way of illustration and not by way of limitation, the invention relates generally to methods and apparatus of the type disclosed in the patents to Zwoyer 1,986,422 and Sonneborn et al. 2,200,971.

In accordance with the methods and apparatus disclosed in the aforesaid patents, a web of material is pulled over a form to shape it into a tube. Heat and pressure are applied to form a seal transversely of a previously formed tube, overlapping portions of the material forming the tube being sealed longitudinally in the course of the downward movement of the material around the tubular mandrel about which the tube has been formed.

As is clearly disclosed in those patents, a series of containers are successively formed, being successively supplied by measured or weighed quantities of the product to be packaged, which may be of various kinds including granular and pulverulent materials.

It is, of course, desirable to operate the machine at the highest rate possible in order to produce the filled packages as quickly as possible.

One of the objects of the present invention is to provide an apparatus and method for increasing the speed of filling containers produced by a method and apparatus of the general type disclosed in the aforesaid patents.

It is also desirable that the material being packaged shall be prevented from discharging into the room in which the packaging operation takes place. This is particularly important where the product being packaged is pulverulent which, in prior apparatus and other methods, resulted in substantial amounts of the product being discharged into the packaging room.

A further object of the invention is to provide a method and apparatus which will make possible and/or facilitate sealing when packaging pulverulent materials.

Another object of the invention is to provide a method and apparatus which will prevent the discharge of packaging material into the atmosphere adjacent the location of the packaging apparatus.

Another object of the invention is to provide a simple method and apparatus which can be readily adapted for use with automatic packaging machines and methods of the type now in general use and which will improve the efficiency thereof.

Still another object of the invention is to provide structure and means for positively driving the product to be packaged downwardly into the bag or container as a means of more rapidly filling the bag or container.

A more specific object of the invention is to provide means into which excess dust from the product being packaged can be deposited, thereby preventing contamination of the atmosphere and also conserving such excess product material.

Other objects and purposes of the invention will appear from the following description and by reference to the accompanying drawings, in which FIGURE 1 is a schematic view in elevation illustrating an apparatus embodying the invention and adapted to perform the process or method to which the invention relates;

FIG. 2 is a fragmentary elevational view on the line 2—2 of FIG. 1, but on a slightly larger scale;

FIG. 3 is a fragmentary view on the line 3—3 of FIG. 1, but on a slightly larger scale;

FIG. 4 is a cross-sectional view on the line 4—4 of FIG. 3 but on an enlarged scale with respect thereto.

Attention is invited to FIG. 1 wherein apparatus embodying the present invention and for practicing the process is supported upon a floor or other surface 10. The apparatus comprises a suitable framework 11 including a base portion 12, upright 13, and horizontally disposed plate structure 14. As shown, the plate structure comprises an upper main plate member 15 and an underlying member 16 which is secured to the plate 15 and which serves to support an internal filler tube 17 and an external mandrel tube 18. The mandrel tube 18 is larger than the filler tube 17 and is positioned to provide an annular space 19 between the outer surface of the filler tube 17 and the inner surface of the mandrel tube 18.

As shown, the filler tube 17 extends above the upper end of the mandrel tube 18 and below the lower end of the latter, the upper end of the filler tube being enlarged as indicated at 20 to facilitate reception of the product which is to be packaged and which is discharged thereinto.

The product to be packaged will either be a weighed amount or a measured volume which will be discharged into the upper receiving end of the filler tube at predetermined intervals.

As illustrated in FIG. 1, 21 represents a conventional volumetric measuring mechanism designed to discharge into the top of the filler tube measured quantities of the product to be packaged at predetermined intervals. Since such structures are well known it is not thought necessary to illustrate the same in detail.

The Zwoyer Patent 1,986,422 discloses a suitable type of measuring mechanism. It will be understood that the mechanism disclosed in Zwoyer is of the duplex type because two webs are formed into tubes at the same time and, hence, there are two feeder tubes. As herein illustrated, there is but a single feeder tube so that for this specific apparatus the mechanism 21 is modified accordingly. However, the single feed is by way of illustration and not by way of limitation.

As explained above, weighed quantities can be discharged into the filler tube at predetermined intervals but, since apparatus for this purpose is or may be conventional, it is not thought necessary to illustrate the same.

*The Formation of the Tube from Web Material*

As is conventional in apparatus of the type referred to, there is a roll R of web material W of Pliofilm, cellophane, or like material, preferably of the type which seals itself upon the application of heat and pressure. The web material W is withdrawn from the roll R and formed around the mandrel tube or former 18, overlapping portions being sealed by the conventional sealer means S, thus forming a tube T which extends beyond the lower end of the mandrel or former tube 18.

The arrangement illustrated for feeding the webbing W and the tube T formed therefrom comprises the mechanism F, which is conventional, reciprocating between the dotted position and the full line positions illustrated. As the web feeding mechanism approaches the dotted line position the members F1—F2 thereof move toward one another to the dot and dash position (see FIGS. 2 and 3). The dot and dash position may be considered the beginning of the stroke, and the full line position the end of the stroke. The members F1—F2, in moving together, flatten the tube and cross seal it, at the same time severing the sealed material crosswise and intermediate the flattened sealed area. It will be understood that filling takes place while the members F1—F2 move from the dot-dash position to the full line position, at which time portions of the tube move progressively downward, presenting an open top and a closed bottom. At the end of the down stroke of a cycle, the members F1—F2 move away from each other and the filled and closed bag or container drops by gravity away from the filled container above, which has its bottom portion sealed but which is still open at the top, as indicated in the drawings.

If it be assumed that the mandrel tube 18 also constituted the feed tube and there were no separate tube 17, as is the case in prior constructions of this general type, then the forming of the tube from the web material, the filling thereof, the cross sealing, etc., to successively form and fill containers would be conventional.

The present invention relates to the steps of the method and the apparatus provided which serve to perform important additional functions.

*Further Comments Re Inventive Features*

In conventional apparatus of this general type the product falls through a hollow tube, which serves as a mandrel around which the sheet webbing is formed to tubular shape and also as a filling tube through which the product is guided to the container or bag portion of the web at the bottom of the tube. It will be understood that at this time the container or bag portion of the tubular web is closed at the bottom but open at the top and that the open top is in direct communication with the hollow mandrel tube. As the product falls by gravity into the container portion of the web, the air therein is displaced and moves upwardly into the tubular mandrel feeder tube, finally discharging to atmosphere at the top thereof.

This upward flow of air is objectionable for several reasons. One, since the displaced air flow is upward and, hence, in a direction counter to the downward flow of the product to be packaged, such air tends to retard the downward flow of the product. This results in slowing the feeding operation so that fewer bags or containers can be filled per unit of time.

Again, and particularly when packaging pulverulent materials, the upwardly moving air stream carries with it a certain amount of the pulverulent material and discharges it to atmosphere. This in objectionable because it pollutes the atmosphere and also wastes the product this discharged.

The above and other objectionable results are overcome by the present apparatus and method, as will now be explained.

As before described, the webbing material, instead of being formed on the outer surface of the filler tube 17, is formed on the larger concentrically positioned hollow mandrel 18 which provides the concentric space 19 between the tubes 17 and 18.

There is provided a suction fan or blower 30 mounted to discharge into a dust collecting chamber 31. A conduit 32 communicates an outlet opening 33 of the concentric space 19 with the suction fan or blower. The suction fan or blower is of the type adapted to move relatively large volumes of air and being operable to create a vacuum in the space 19 between the mandrel and filler tube of the order of say 4 to 5 inches of mercury.

A number of advantageous results flow from the apparatus and method features just described, some of which are as follows:

(1) The air which would normally be displaced from the bag or container being filled, instead of flowing upwardly through the feeder tube 17 is withdrawn and discharged into the dust collector 31. Therefore, there is no counterflow of air upwardly through the feeder tube 17 to retard the down flow of the product. Hence, the product moving downwardly through the filter tube moves more rapidly. Indeed, the downwardly moving air stream acts as a positive element in forcing the product along its downward path.

(2) Because there is no air moving upwardly through the feeder tube there is no danger of pulverulent material discharging through the upper end of the feeder tube into the atmosphere with the resultant contamination of the atmosphere and also loss of the material so discharged.

(3) While it is likely some pulverulent material might move with the air through the passageway 19 and the conduit blank, it is discharged into and retained in the dust collector tank 31 so that it will not be lost nor will it contaminate the atmosphere.

(4) In the operation of apparatus of the type disclosed in the aforesaid patents, the product mass, in falling through the feeder tube, tends to form a stream rather than a compact mass. This so-called streaming effect is a factor in limiting the number of bags or containers that can be filled per unit of time. In the present method and apparatus streaming is overcome or substantially reduced since the product is forceably carried downwardly not only by gravity but also as a result of the downwardly moving air stream within the feeder tube caused by the suction or vacuum action before described. This results in maintaining the product more nearly as a compact mass or slug and is a factor in permitting high speed operation.

(5) Because the product is moving as a compact mass or slug, when reaching the container or bag the product is leveled, thus making it possible to use a bag or container of less length.

(6) The removal of all or part of the air from the bag or container tends also to reduce the required size or volume of the bag or container. This is advantageous because less bagging material is required and also because a larger number of bags containing a given weight can be packed in a carton or shipping case of given size.

(7) By eliminating the air or a major portion thereof from the bag or container, danger of bursting the bag by causing a compression of the air when bags are stacked, one upon the other, is avoided, or at least greatly minimized.

Heretofore in packing pulverulent materials it has been difficult and/or impossible properly to seal the container because pulverulent material settled between the confronting portions of the tube being sealed. However, removal of air from the container and formed tube also removes substantially all such material, thus presenting substantially clean surfaces for sealing.

Practice of the method by the disclosed apparatus has demonstrated that it is possible to obtain much higher machine cycling speed. Indeed, under commercial conditions the speed of operation has been approximately doubled.

The method and required apparatus are simple in construction and operation and inexpensive to produce satisfactorily over long periods of time.

While reference has been made to apparatus which forms a web or film of material into a tube and in which the web or film is of the type which can be sealed by heat and pressure, it should be understood that the invention is not limited to the use of such materials.

I claim:

1. The method of packaging comprising the steps of forming a packaging tube around a mandrel tube, moving the formed tube past the lower end of the mandrel tube to provide a product-receiving package space in said formed tube, pressing portions of the packaging tube together at a level below the bottom end of the mandrel tube and thereby forming a cross seal at one end of the product-receiving package space of the packaging tube, feeding the product to be packaged downwardly through a defined substantially unobstructed path internally of the mandrel tube and discharging the product into said product-receiving space and creating a partial vacuum in the product-receiving space whilst said product is being fed thereto through said defined path.

2. The method of packaging comprising the steps of forming a packaging tube around a mandrel tube, moving the formed tube past the lower end of the mandrel tube to provide a product-receiving package space, pressing portions of the packaging tube together at a level below the bottom end of the mandrel tube and thereby forming a cross seal at one end of the product-receiving package space of the packaging tube, feeding the product to be packaged downwardly through a defined substantially unobstructed path internally of the mandrel tube and discharging the product into said product-receiving space and causing air to flow downwardly in said defined path through which the product is being fed, and upwardly in a defined path which communicates at its lower end with the lower end of the defined path through which the product is being fed.

3. The steps of the method set forth in claim 2 in which dust in the upwardly moving air is removed prior to its discharge to atmosphere.

4. The steps of the method set forth in claim 1 and the further step of pressing portions of the packaging tube together to form a cross seal above the product in the adjacent lower portion of the packaging tube.

5. The method of packaging comprising the steps of forming a packaging tube around a mandrel tube, pressing portions of the packaging tube together at a level below but adjacent the bottom end of the mandrel tube, thereby forming a cross seal, moving the formed tube downwardly to provide package space, feeding the product to be packaged downwardly through a defined substantially unobstructed path internally of the mandrel tube and discharging the product into said product-receiving space, creating a partial vacuum in the product-receiving space whilst said product is being fed thereto through said defined path, pressing portions of said formed tube together to form a cross seal above the product discharged into said product space and moving the formed tube further downwardly to provide a further packaging tube space.

6. The steps of the method set forth in claim 5 in which batches of the product to be packaged are fed at spaced intervals and the vacuum created acts to assist the downward flow of successive batches of the product.

7. In a packaging machine of the type making a tube from a web of material, filling a portion thereof with a product and sealing at each end of the product the combination comprising a mandrel tube, means for forming a tube of web material about said mandrel tube, means interiorly of said mandrel tube defining a plurality of passageways extending lengthwise of the mandrel tube, said passageways being in open communication with the product-receiving space of said tubular web, at least one of said passageways being formed and adapted to receive at its upper end a product to be packaged and to discharge the same at its lower end into said product-receiving space of the tubular web, and means operatively connected to another of said passageways for creating a partial vacuum therein, the said passageway which is formed and adapted to receive, at its upper end, the product to be packaged and to discharge the same, at its lower end, into the product-receiving space of the tubular web terminating at its lower end in a plane lower than that of passageways to which means are operatively connected for creating a partial vacuum therein.

8. In a packaging machine of the type making a tube from a web of material, filling a portion thereof with a product and sealing at each end of the product the combination comprising a mandrel tube, means for forming a tube of web material about said mandrel tube, means interiorly of said mandrel tube defining a plurality of passageways extending lengthwise of the mandrel tube, said passageways being in continuous open communication with the product-receiving space of said tubular web, at least one of said passageways being formed and adapted to receive at its upper end a product to be packaged and to discharge the same at its lower end into said product-receiving space of the tubular web, and means operatively connected to another of said passageways for creating and continuously maintaining a partial vacuum therein, said last-mentioned passageway being substantially unobstructed throughout.

9. The method of packaging comprising the steps of forming a packaging tube around an upright mandrel tube, moving the formed tube past the lower end of the mandrel tube to provide a product-receiving package space, pressing portions of the packaging tube together at a level below the bottom end of the mandrel tube and thereby forming a cross seal at one end of the product-receiving package space of the packaging tube, providing a defined upright path internally of the mandrel tube, feeding the product to be packaged into the upper end of said upright path and discharging the product into said product-receiving space whilst causing air in substantial volume to flow downwardly in said defined path through which the product is being fed, and upwardly in a defined path which communicates at its lower end with the lower end of the defined upright path through which the product is being fed, responsive to the creation of a vacuum of low order in said defined path.

10. The method set forth in claim 9 in which the vacuum created between the defined filler path and the mandrel tube is of the general order of 4 to 5 inches of mercury.

11. In a packaging machine of the type making a tube from a web of material, filling a portion thereof with a product and sealing at each end of the product the combination comprising a mandrel tube, means for forming a tube of web material about said mandrel tube, means interiorly of said mandrel tube defining a plurality of passageways extending lengthwise of the mandrel tube, said passageways being substantially unobstructed and being formed and adapted to receive at its upper end a product to be packaged and to discharge the same at its lower end into said product-receiving space of the tubular web, and means operatively connected to another of said passageways for creating a partial vacuum therein, said passageway which is formed and adapted to receive and discharge the product terminating at a lower plane than that of the other of said passageways.

12. In a packaging machine of the type making a tube from a web of material, filling a portion thereof with a product and sealing at each end of the product the combination comprising a mandrel tube, means for forming a tube of web material about said mandrel tube, a substantially unobstructed product-feeding tube interiorly of said mandrel tube and disposed to define with the mandrel tube at least one passageway extending lengthwise of the mandrel tube, said product-feeding tube and said passageways being in open communication with the product-receiving space of said tubular web, said product-feeding tube being formed and adapted to receive at its upper end a product to be packaged and to discharge the same at its lower end into said product-receiving space of the tubular film, and means operatively connected to another of said passageways for creating a partial vacuum at the discharge end of said feeding tube, the said product-feeding tube extending to a level below that of the mandrel tube.

References Cited in the file of this patent

UNITED STATES PATENTS

| | | |
|---|---|---|
| 1,986,422 | Zwoyer | Jan. 1, 1935 |
| 2,145,941 | Maxfield | Feb. 7, 1939 |
| 2,432,373 | Bleam et al. | Dec. 9, 1947 |